United States Patent [19]
Roberts, Jr.

[11] 4,131,149
[45] Dec. 26, 1978

[54] POLYURETHANE TIRE SIDEWALLS

[75] Inventor: Durward T. Roberts, Jr., Akron, Ohio

[73] Assignee: The Firestone Tire & Rubber Company, Akron, Ohio

[21] Appl. No.: 753,074

[22] Filed: Dec. 21, 1976

Related U.S. Application Data

[63] Continuation of Ser. No. 589,153, Jun. 19, 1975, abandoned.

[51] Int. Cl.$^2$ .............................................. B60C 9/14
[52] U.S. Cl. .................. 152/357 A; 152/DIG. 12; 156/116; 264/245
[58] Field of Search .............. 152/DIG. 12, 330 R, 152/353 R, 357 A; 156/116, 310, 314; 260/77.5 AN, 77.5 TB, 77.5 AP; 264/245

[56] References Cited

U.S. PATENT DOCUMENTS

| Re. 28,424 | 5/1975 | McGillvary | 152/357 A |
|---|---|---|---|
| 2,566,328 | 9/1951 | Hessney et al. | 152/DIG. 12 |
| 2,574,233 | 11/1951 | Wolf | 152/353 R |
| 2,742,942 | 4/1956 | Owen | 156/116 |
| 2,749,960 | 6/1956 | Schwartz | 152/357 A |
| 2,905,582 | 9/1959 | Coleman, Jr. et al. | 152/357 A |
| 3,648,748 | 3/1972 | Lovell | 152/353 R |
| 3,806,486 | 4/1974 | Endriss et al. | 152/357 A |

*Primary Examiner*—Albert J. Makay
*Assistant Examiner*—Carl Rowold

[57] ABSTRACT

Polyurethane pneumatic tires with colored sidewalls are produced by applying one or more elastomeric coatings thereto. A colored polyurethane elastomeric coating may be applied directly to the sidewall, but it may be applied to a primer elastomeric coating which is first applied and the colored coating is applied to it either before or after it is cured. The color of the colored coating may be produced by dyeing or pigmenting.

7 Claims, 4 Drawing Figures

POLYURETHANE TIRE SIDEWALLS

This application is a continuation of Ser. No. 589,153 filed June 19, 1975 now abandoned.

PRIOR ART

The invention is applicable to polyurethane tire sidewalls formed from polyurethane such as disclosed in McGillvary U.S. Pat. No. 3,701,374; Benezee U.S. Pat. Nos. 3,775,528 and 3,537,500 for example.

The long adhesion of the polyurethane coatings of this invention to a sidewall is obtained by reacting the NCO in the colored coating to the polyurethane of the sidewall. This provides the required adherence of the polyurethane to the rubber of the tire.

DEFINITIONS

The term polyurethane as used herein designates both pure polyurethanes and polyureaurethanes (sometimes called polyureapolyurethanes). A polyurethane is synthesized from a polyol which is terminated with a diisocyanate to form a prepolymer. The prepolymer may be cured with a diol. Illustrative equations are:

 + 2OCNR'NCO →     Equation No. 1

Polyurethane Prepolymer

Prepolymer + 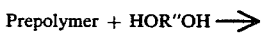 →     Equation No. 2

cured Polyurethane

A polyureaurethane is synthesized from a polyol which has been terminated with a diisocyanate to form a prepolymer. The prepolymer may be cured with a diamine or a hydroxylamine. An illustrative equation is:

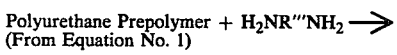 →     Equation No. 3
(From Equation No. 1)

Polyurethane

SUMMARY OF THE INVENTION

The sidewall of any polyurethane type pneumatic vehicle tire can be colored according to this invention.

The elastomer of the tire sidewall may be essentially any polyurethane-type elastomer, usually a polyureaurethane, which is suitable for production of castable pneumatic tire bodies. This includes isocyanate-terminated diols (e.g. polytetrahydrofuran, polypropylene glycol, polyesters, etc.) which are extended with diamines, diols or ethanolamines.

The pneumatic tires may or may not be provided with an inner tube. It may be of any belted structure. It usually consists of a casing with or without an inner tube on a steel or other wheel. Some tires consist only of a heavy one-piece casing directly on a wheel.

The Sidewall

The invention is designed particularly for coloring cast polyurethane passenger tires, but is applicable to the sidewalls of tires for aircraft and even busses and trucks and all other tires to which manufacturers' names, trademarks, advertising slogans, etc. may be applied in color. The white sidewall may comprise a single wide band or one or more narrow bands.

Although designed particularly for sidewalls of conventional rounded contour, there is no reason why the coloring processes of this invention cannot be applied to sidewalls of unusual shape, such as, for example, the sidewalls described in Tangorra U.S. Pat. No. 3,840,060.

The coloring procedure of this invention is applicable to the sidewall of any tire to which it adheres during prolonged constant flexing to meet the test set forth herein.

There are two general procedures for applying a colored coating to a sidewall: (1) The application of a colored coating directly to a sidewall formed of a polyurethane rubber and (2) the application of a colored coating to a primer coating which has been applied to such a sidewall.

The colored coating and the primer coating may be applied as a liquid or paste, in any suitable manner, as by brushing, rolling, spraying, fluoring, etc. NCO present in the coating, reacts with polyurethane in the sidewall or primer. They are often applied by rolling them over a sidewall surface on which the design, such as lettering, etc., is raised, or by rolling one or more stripes on a sidewall which may be flat or be provided with raised stripes, so that the roller contacts only the raised area or areas. They may be applied in other ways. Spraying is usually applied after areas of the sidewall are covered by masking. The details of the various methods of applying the coatings are known to the art.

a. The Colored Coating — The colored coating is elastomeric and is preferably a polyureaurethane but may be any polyurethane derived from a substantially saturated hydroxy-terminated-polyol. It may be synthesized from a composition of polyurethane prepolymer, dye and/or pigment, curing agent and solvent.

b. The Primer Coating — The primer coating will not include any dye or pigment and is not necessary to the performance of the colored coating and is a polyureapolyurethane or other polyurethane and synthesized from a polyurethane prepolymer as the colored coating is. It includes a curing agent and solvent.

The invention is illustrated by the accompanying drawings in which.

Figure 1:
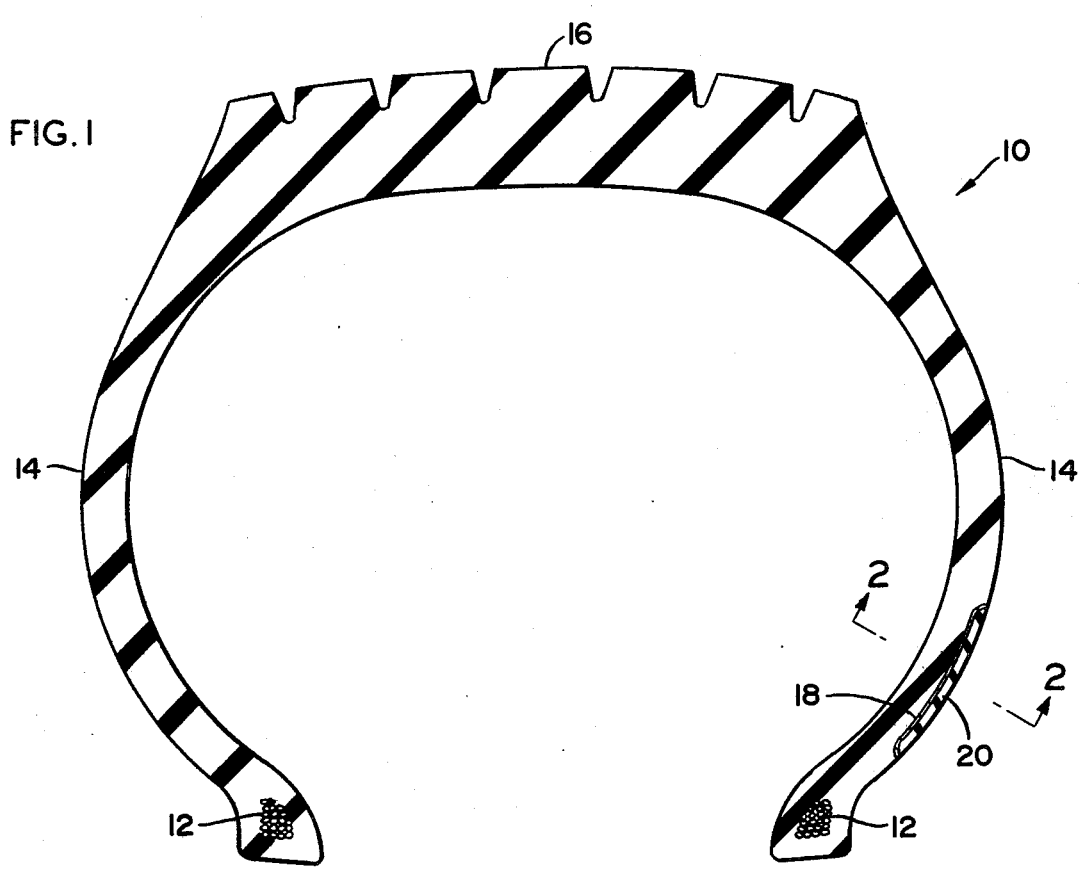
FIG. 1 is a side view of a tire with a white sidewall.

FIG. 1 is a sectional view through a tire 10 with beads 12. The carcass is 14 and the tread is 16. The location of the white sidewall is illustrated by the groove which is coated with the primer coating 18 and the white sidewall or other colored coating 20. The colored coating 20 is a polyurethane. The primer coating 18 is also a polyurethane as will be evident from this specification.

Figure 3:
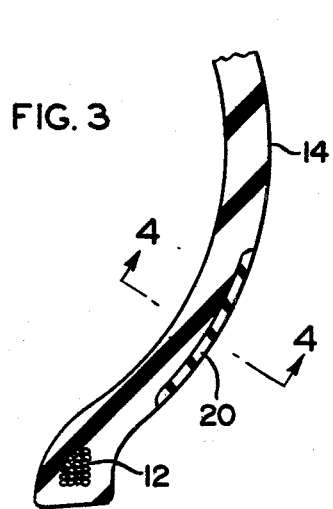
FIG. 3 is a sectional view of a white sidewall attached directly to the carcass of the tire without the use of a primer coating.
Figure 2:
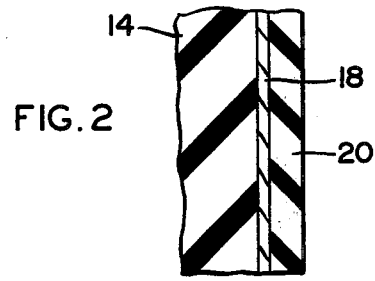
FIG. 2 is an enlarged sectional view on the line 2—2 of FIG. 1 showing a white sidewall superimposed over the primer coating which is on the sidewall of the tire.
Figure 4:
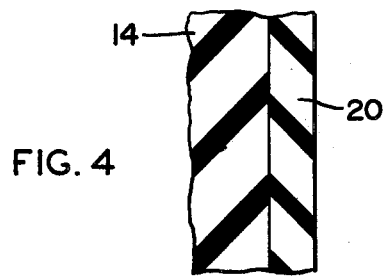
FIG. 4 is a section on the line 4—4 of FIG. 3.

In FIG. 3 the carcass 14 can be of any polyurethane suitable for castable tires. The white sidewall or colored coating 20 is applied to the sidewall of the tire in these cases without the use of the primer coating.

1. THE APPLICATION OF A COLORED COATING DIRECTLY TO A SIDEWALL.

Various elastomeric materials may be utilized in forming this coating. The elastomer must be firmly bonded to the polyurethane sidewall, and for this purpose the coating is synthesized from a polyurethane prepolymer, a curing agent, a dye and/or pigment and solvent. The colored coating is applied in any suitable manner to provide a thickness of from 2 to 30 mils or more up to, for example, 100 mils or more, depending upon such considerations as cost, required scuff resistance, etc.

The prepolymer which may comprise a triol as well as diol is not synthesized from an unsaturated prepolymer polyol such as a polybutadiene polyol as, for instance, Arco R45M or Arco CS15 which do not resist environmental deterioration, but is synthesized from a substantially saturated hydroxy-terminated diol having a molecular weight of 500 to 10,000 or higher, and preferably in the molecular weight range of 2,500 to 4,000. The usable polyols include hydrogenated polybutadiene diol, hydrogenated styrene polybutadiene diol, polytetrahydrofuran, polypropylene glycol, polyester diols, which may include triols etc. The polyol is reacted with a substantially saturated aliphatic diisocyanate, for instance, hydrogenated methylene diphenyl diisocyanate ($H_{12}MDI$), hexamethylene diisocyanate, isophorone diisocyanate or any other aliphatic diisocyanate which produces an environmental resistant polyurethane. The reaction of the polyol with a diisocyanate to produce the prepolymer is illustrated in the following equation:

$$HO(CH_2CH_2CH_2CH_2)_nOH + OCNC_{13}H_{22}NCO \qquad \text{Equation No. 4}$$

$$\downarrow$$

$$OCN(C_{13}H_{22})NH\overset{O}{\overset{\|}{C}}O(CH_2CH_2CH_2CH_2)_nO\overset{O}{\overset{\|}{C}}NH(C_{13}H_{22})NCO$$

in which $C_{13}H_{22}$ is

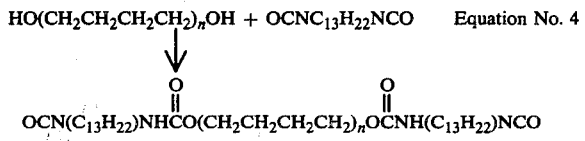

and n is sufficient to give a prepolymer which preferably has a molecular weight of substantially 3,000 to 4,500, although a lower molecular weight may be tolerated.

The reaction takes place on heating the diisocyanate and the polyol at 70° to 80° C. for 5 to 24 hours. A catalyst such as dibutyl tin dilaurate (DBTDL) or other catalyst may be used to speed up the reaction.

In synthesizing the prepolymer, the diisocyanate is reacted with the polyol in the ratio of 1.2 mols to 2.2 mols of the diisocyanate per 1 mol of the polyol. The ratio depends upon the molecular weight of the polyol. Preferably, a ratio of around 1.8 mols of diisocyanate to 1 mol of polyol is used when the polyol molecular weight is in the range of 2,500 to 3,000 or more. The molecular weight of the prepolymer is critical. When a diamine is used as a curing agent with a prepolymer having a molecular weight below the range of 2,500 to 3,500, the flex-crack resistance of the colored coating made from the prepolymer may be unsatisfactory. If the molecular weight of the diol is too low, the colored coating produced will be too hard and will therefore flex-crack. If diol or hydroxyamine curing agents are used, much lower prepolymer molecular weights can be tolerated and still maintain satisfactory flex life.

Colored coatings containing aromatic diisocyanate are apt to discolor in light — particularly sunlight. Therefore, the diisocyanate used to make the prepolymer in the colored coating is preferably aliphatic.

The curing agents used can be diamines, diols or hydroxyamines. When the amine function is used, the curing agent is preferably aliphatic if discoloration in the colored coating is to be avoided. Examples of curing agents that can be used include: diols — butanediol, ethyleneglycol, pentanediol, hexanediol, cyclohexanediol and various isomers thereof and other diols; hydroxyamines — ethanolamine, propanolamine or other hydroxy amines; and diamines — ethylene — diamine, hexamethylenediamine, hydrogenated methylene dianiline, isophorane diamine or other diamines.

a. Use of Aliphatic Diamine With a Blocking Agent — When an aliphatic diamine curing agent is used, it should be blocked to control the rate of its reaction with the diisocyanate. The blocked amine can be prepared by reacting the diamine with a blocking agent such as a ketone or aldehyde of the formula $R_2C=O$ in which R may be hydrogen, methyl, ethyl, propyl, isopropyl, butyl, isobutyl, t-butyl, pentyl, isopentyl, neopentyl, etc. Typical ketone or aldehydes which may be employed are as follows: isobutyraldehyde, t-butylaldehyde, methyl t-butylketone, methyl isobutyl ketone, ethyl t-butylketone, etc. The art on blocked diames includes Nazy et al. U.S. Pat. No. 3,493,543, Haggis et al. U.S. Pat. No. 3,567,692 and Finelli et al. U.S. Pat. No. 3,784,521 which disclose blocked amines which may be used.

The reaction of the curing agent with the ketone or the aldehyde is performed by refluxing the two materials in benzene to azeotrope off the water, as shown in the reaction below, in which hydrogenated methylene dianiline is the curing agent.

Equation No. 5

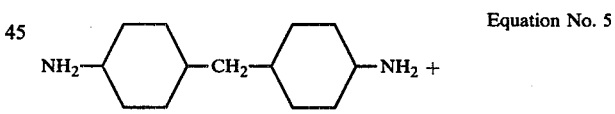

Hydrogenated methylene dianiline

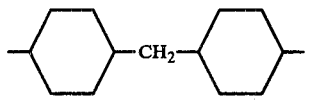

Ketone or aldehyde

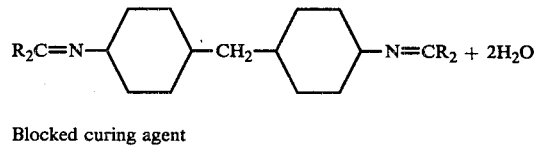

Blocked curing agent

The reaction of the above curing agent with the polyurethane diisocyanate-terminated prepolymer to form a polyurethane is complete after 60 to 5 minutes at 100° to 140° C. The equation for these reactions is shown below:

Equation No. 6

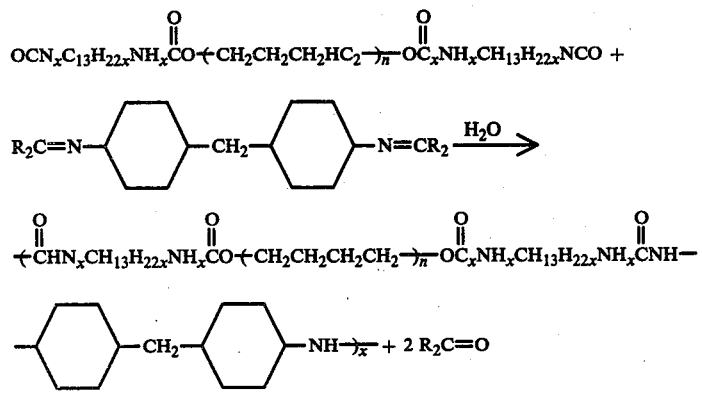

$$OCN_xC_{13}H_{22x}NH_xCO(CH_2CH_2CH_2HC_2)_n OC_xNH_xCH_{13}H_{22x}NCO +$$

$$\text{-}CHN_xCH_{13}H_{22x}NH_xCO(CH_2CH_2CH_2CH_2)_n OC_xNH_xCH_{13}H_{22x}NH_xCNH\text{-}$$

$$\text{-}NH)_x + 2 R_2C=O$$

When diols or hydroxy amine curing agents are used, no blocking agent is necessary, but a catalyst, such as dibutyl tin dilaurate (DBTDL), for instance, will ordinarily be used.

The colored coatings are prepared in most solvents such as benzene, toluene, xylene, or in another aromatic solvent; hexane, heptane, octane, acetone, methyl ethyl ketone, methyl isobutyl ketone, and methyl butyl ketone can also be used. The prepolymer and curing agent must be soluble in the solvent chosen.

The coating composition can be applied without solvent if thicker layers are to be applied. In this case, the prepolymer, curing agent and pigment are mixed and extruded onto the tire. In this case, the contents must be degassed before they are extruded so as to prevent formation of air bubbles.

Pigments may be mixed with the other materials to make the colored coatings. The pigments are used to give the coating hiding power as well as for obtaining a desired color. The best pigment to use to obtain a white coating is $TiO_2$. If colors such as yellow, blue and green are desired, adding small amounts of dyes to the coating, with or without $TiO_2$ will give the desired effect. If darker colors such as reds, browns, purples and blacks are desired, other pigments and/or dyes are necessary. For dark-colored coatings, elastomers which discolor or are somewhat discolored may be utilized and no barrier strip is required; whereas for a white or light-colored coating, prepolymers, etc. which discolor are to be avoided. The coatings may contain reflective beads.

2. THE APPLICATION OF A COLORED COATING TO A PRIMER COATING ON THE SIDEWALL

A primer coating may be applied to the sidewall and then the colored coating can be applied to this. The colored coating used in this treatment is identical to that described under the above heading: "1. THE APPLICATION OF A COLORED COATING DIRECTLY TO A SIDEWALL."

The primer coating is synthesized from a polyurethane prepolymer, a curing agent, solvent and sometimes other compounding ingredients. The primer coating is usually applied to the cured sidewall by conventional means as described above. The thickness of the primer coating can vary from 0.1 to 5 mils or more, and preferably, because of the cost of the materials, a thickness of only about 0.1 to 1.0 mils is desired. The prepolymer is synthesized from a diol as described in Equation No. 1.

Preferably prepolymers made from an approximately difunctional hydroxy-terminated polybutadiene or other unsaturated rubber of substantially 500 to 5,000 molecular weight or higher is used in the primer coating because it appears to wet the surface of the rubber and give better adhesion than other polymeric prepolymers, but, other such prepolymers etc. may be used. The preferable molecular weight range for the prepolymer is 2,500 to 4,000. A diol is reacted with a diisocyanate such as toluene diisocyanate (TDI), methylene diphenyl diisocyanate, (MDI), methylene diisocyanate that has been hydrogenated (HMDI), isophorone diisocyanate, hexamethylene diisocyanate or other diisocyanate to form the prepolymer.

Curing Agents For the Primer Coating

There are three types of curing agents that can be used for curing the polyurethane prepolymer whether in the colored coating or the primer coating; namely, diamines, diols or hydroxyamines. When the amine function is used to cure the primer, the curing agent can be aromatic or aliphatic.

The diol curing agents include ethyleneglycol, propane diol, butane diol, pentane diol, hexane diol, cyclohexane diol and isomers thereof and other diols.

The hydroxyamine curing agents include: ethanol amine, propanol amine and other hydroxy amines which are known to be curing agents.

The diamine curing agents include:

| Aromatic Curing Agents | Aliphatic Curing Agents |
|---|---|
| MOCA, methylene-dianiline, toluene diamine, phenylene diamine | hydrogenated methylene dianiline, hexamethylene diamine, isophorone diamine, ethylene diamine |

Three types of diamine curing agents, namely, aromatic (including hindered and non-hindered) and aliphatic, are used depending upon the diisocyanate used in the prepolymer.

a. Use of Aliphatic Diamines With Aliphatic Diisocyanates — An aliphatic diamine must be blocked to control its rate of reaction with the diisocyanates. This is effected, as in the colored coating, by reaction of the curing agent with a ketone or aldehyde. The reaction is effected by refluxing the two materials in a water-immiscible solvent such as benzene to azeotrope off the water, as shown in Equation No. 5, as known in the art.

The blocked diamine is reacted with the diisocyanate prepolymer as shown in Equation No. 6 to yield the cured polyureaurethane coating.

b. Use of Aromatic Diamines With Blocked Diisocyanates

The second type of curing agent is a non-hindered aromatic diamine that is used with an aromatic diisocyanate-terminated prepolymer. In this case, blocking agents are usually used on the diisocyanate. The blocking agents that are used include phenol, oximes such as cyclohexanone oxime, etc., which are removed from the amine when the reaction mixture is heated. The blocking agent is reacted with the free NCO groups on the prepolymer as represented by the following equation:

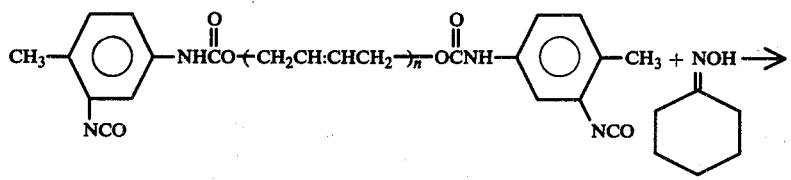

Equation No.7

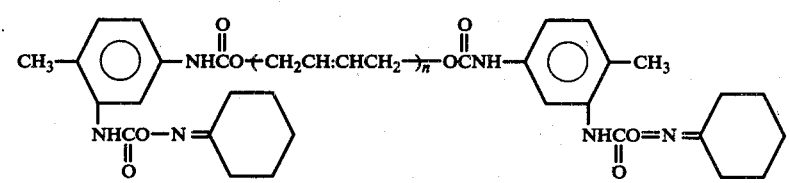

The blocked diisocyanate is reacted with any non-hindered aromatic diamine curing agent at a temperature of 100° to 140° C. for around 60 to 10 minutes, respectively, to give a polyurethane suitable for a primer coating. The blocking agent volatilizes during heating; liberating the diisocyanate group with then reacts with the curing agent, as illustrated in the equation below:

Product from Equation No. 7

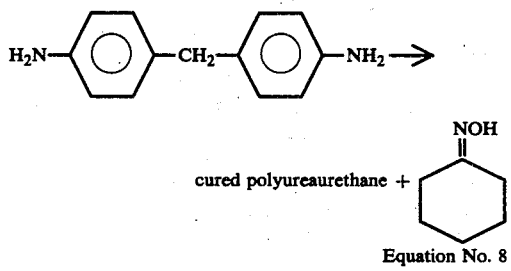

Equation No. 8

Other diamines that may be used with blocked aromatic diisocyanate prepolymers are toluene diamine, phenylene diamine, bis-4-aminophenyl sulfane, naphthylene diamine, anthracene diamine, etc.

c. Use of Aromatic Diamines With Aliphatic Diisocyanate Terminated Prepolymers — If aliphatic diisocyanates are used in prepolymers, no blocking agent is necessary when the curing agents are aromatic diamines for the reaction rate is slow enough at room temperature to permit a reasonable pot life of the primer.

d. Use of Hindered Aromatic Diamines With Aromatic Diisocyanate Terminated Prepolymers — Hindered diamines such as 4,4'-methylene-bis-(2-chloro aniline)-(MOCA), 4,4'-methylene bis(2-methoxyaniline), 4,4'-methylene bis (2-methylaniline), etc. can be reacted with aromatic diisocyanate terminated prepolymers without blocking agents. Cure times are 120° C. for 2 hours.

The primer coatings are applied to the sidewall or the barrier strip and cured at elevated temperatures to form the elastic polyureaurethane film. Colored coatings are then applied over the cured primer coating and heat-cured.

e. Primer Coating That is Not Cured Before Applying Colored Coating — Another type of primer coating that is not cured before the colored coating is applied, is synthesized by mixing a diisocyanate-terminated prepolymer, diisocyanate, and solvent. This material is applied to the rubber by conventional means, immediately followed by application of the colored coating. The colored coating and the primer coating are cured together for 60 to 10 minutes at 100° to 140° C., respectively.

It is not necessary that the primer coating be completely cured if the colored coating is applied to it before the free isocyanate groups in the primer coating have hydrolyzed. The curing agent in the colored coating migrates into the primer coating and reacts with the isocyanate groups.

3. TESTING THE COLORED COATING ON POLYURETHANE RUBBER

The thickness of the colored coating may vary depending upon considerations such as cost, scuff resistance, etc.

In the colored coating, an aliphatic diamine is preferred for reaction with an aliphatic diisocyanate (for example, $H_{12}$MDI, isophorone diisocyanate and hexamethylene diisocyanate) to provide light stability, although when the coating is a very dark color, aromatic diamines and diisocyanates may be used. The polyol can have a molecular weight of 1,000 to 5,000 or higher, usually no lower than 2,500. Aliphatic diamine curing agents are preferred with blocking as discussed above, to control the pot life and the rate of the reaction. Dyes and/or pigments are included as desired.

The coating is usually cured from about 60 to 5 minutes at 100 to 140° C.

TexUS Tests

A TexUS Flex-Tester Model No. 31-11 of Testing Machines, Inc., Amityville, New York, is used for laboratory testing of the flex-crack resistance of coatings used on polyurethane rubber samples. T-shaped samples with a groove in the leg are made of various elastomeric rubbers used in tire sidewalls. The samples are cleaned and painted with either a colored coating or a primer coating in combination with a colored coating on the opposite side from the groove. The painted samples are placed in the TexUS Flex-Tester on a wheel. The wheel is turned at such a rate as to cause the samples to bend under strain 720 times per minute. The angle of bend of the rubber is 60 to 70 degrees, with a flex elongation of 18 to 25 percent. The coated sidewalls of this invention should withstand 250,000 flexes when subjected to this test.

Weather Test ASTM D750-68

Weather exposure apparatus (carbon arc) was used for artificial weather testing. Painted samples were exposed to the carbon arc for one week at 110 to 120° C. with water spray cycles for ten minutes each hour. The samples were examined for discoloration, loss of adhesion, and loss of gloss.

Tire Test

Tires are painted with colored coatings with and without first coating with a primer coat, as described herein, and then subjected to indoor and outdoor testing. The indoor testing involves mounting the painted tire on a rim, inflating to 24 psi and testing on an indoor wheel against a flat, large-wheel surface at 50 mph. The load on the tire is gradually increased to 200 percent of the rated load of the tire. The tire is run until it fails. The colored sidewall meets the test if it remains in place and does not crack during the test. The outdoor testing involves placing four tires with color coating on the sidewall onto an automobile and testing the tires on a test track or on a highway at 50 to 60 mph until the tire wears out. The colored sidewall meets the test if it remains in place and does not crack during the test.

Trade Names and Sources

Adiprene LW 520 made by duPont de Nemours and Co. is a $H_{12}MDI$-terminated polytetrafuran diol.

Polymeg 1000 is a polytetrahydrofuran (THF).

Niax is a trademark of Union Carbide Co.

Niax 737 is a polyester with a molecular weight of 2,911.

Niax 1025, 2025 and 3025 are polypropylene glycols (PPG) of molecular weight of 1025, 2025 and 3025.

Arco R45M is polybutadiene diol identified in Sinclair Petrochemicals Inc. (Arco) Product Data Bulletin No. 505 as 100 percent butadiene, having a viscosity of 50 poises at 30° C., an hydroxyl content of 0.80 meq/gm, an equivalent weight of 1250 and iodine number of 398. The diol may be prepared by a process such as disclosed in U.S. Pat. No. 3,333,018 or U.S. Pat. No. 3,673,168 or British Pat. No. 957,788.

DOP is a plasticizer, dioctyl phthalate.

Paraplex G50 is a polyester dispersing agent used to keep titanium oxide in suspension.

Harwick Stan-tone 10 PCO3 is a dispersion containing titanium dioxide in DOP and Paraplex G50.

Preparation of Hydrogenated Arco Polybutadiene Diol

To a hydrogenation reactor add 100 grams of Arco polybutadiene diol, 1300 grams of hexane and 0.81 grams of nickel hippurate (made from nickel chloride and hippuric acid — $C_6H_5CONHCH_2CO_2H$). The mixture is stirred under a hydrogen atmosphere at 160 to 170 psi at 90° C. When the hydrogen pressure stops dropping the reaction is complete. A three molar excess of dimethylglyoxine and 50 grams of filter aid are added to the reaction and the mixture is stirred. After stirring, the catalyst and filter aid are filtered off and the hydrogenated Arco is obtained by removing the hexane under vacuum.

EXAMPLES

Various prepolymers were prepared and tested. Some were tested in primer coatings, some in colored coatings and some in both.

The description which follows refers to the different prepolymers and coatings by numbers given as example numbers in the tables which follow.

Various prepolymers were prepared. It was found that some were more satisfactory for primer coatings and colored coatings than others and to illustrate the invention, the general instructions for preparing those utilized in tested tires follows:

EXAMPLE 1

General Preparation of the Diisocyanate Terminated Prepolymers

To a mixture of the diisocyanate and one drop of dibutyl tin dilaurate (DBTDL) in 100 millimeters of dry toluene at 80° C. is added with stirring the prepolymer diol in 100–300 millimeters of dry toluene over a period of 1 to 2 hours. The mixture is stirred at 80° C. for 6 or 24 hours. After completion, the contents are stored in the absence of air. Table 1 illustrates the polyols used, the diisocyanates used and the amount of each used to synthesize the desired prepolymer. The prepolymers are used to make the primer and colored coatings as described in Examples 3 and 4.

TABLE 1

DIISOCYANATE-TERMINATED PREPOLYMERS

| Number[1] | Polyol Used[2] | Grams Polyol | Grams $H_{12}MDI^3$ Used | NCO/OH (Molar Ratio) |
|---|---|---|---|---|
| 1 | Adiprene LW 520 - 1700 | — | — | — |
| 2 | Polymeg 1000 (PolyTHF) | 400 | 157.2 | 1.5 |
| 3 | Niax D737- 2911 | 291 | 52.4 | 2 |
| 4 | Niax D737- 2911 | 291 | 52.4 | 1.8 |
| 5 | Niax 1025 (polypropylene glycol-PPG) | 205 | 70 | 1.33 |
| 6 | Niax 2025 (PPG) | 202.5 | 47.5 | 1.8 |
| 7 | Niax 3025 (PPG) | 302.5 | 52.4 | 2 |
| 8 | Niax 3025 (PPG) | 302.5 | 47.5 | 1.8 |
| 9 | ARCO R45M polybutadiene-2475 | 247.5 | 52.4 | 2 |
| 10 | ARCO R45M-2475 | 247.5 | 47.5 | 1.8 |
| 11 | 75% hydrogenated ARCO R45M 2550 | 255 | 55 | 2.1 |
| 12 | 100% hydrogenated ARCO R45M 2575 | 257.5 | 52.4 | 2 |
| 13 | 100% hydrogenated ARCO R45M 2575 | 257.5 | 47.5 | 1.8 |

TABLE 1-continued

DIISOCYANATE-TERMINATED PREPOLYMERS

| Number[1] | Polyol Used[2] | Grams Polyol | Grams $H_{12}MDI^3$ Used | NCO/OH (Molar Ratio) |
|---|---|---|---|---|
| 14 | Adiprene LW 520-1700 | — | — | — |

[1] Numbers on Tables 1, 2 and 3 all correspond.
[2] The four-digit number after the name indicates polyol molecular weight.
[3] $H_{12}MDI$ = hydrogenated methylene diphenyl isocyanate.

EXAMPLE 2

Preparation of Blocked Diamines (A) Add 42 grams of hydrogenated methylene dianiline (HMDA) and 40 grams of isobutyraldehyde to 100 millimeters of benzene. Reflux the mixture 1 hour or until 7.3 grams of water have been azeotroped off. Strip off the benzene under vacuum.

(B) Same procedure as in (A) above except use 42 grams of methyl isobutyl ketone in place of the aldehyde.

The blocked amines discussed may be used in the preparation of satisfactory primers and coatings.

EXAMPLE 3

Preparation of Primer Coatings (A) The materials listed below are mixed together in a bottle, screened and either sprayed, brushed or rolled onto a clean rubber surface and cured onto the rubber at 140° C. for 2-5 minutes.

100 grams of $H_{12}MDI$ terminated ARCO R45M polybutadiene polyol (Table 1, No. 9)
13 grams of isobutyraldehyde blocked HMDA
300 grams of toluene (B) The following materials are mixed and applied as illustrated in example (A) above. This primer coating is cured onto the rubber at 140° C. for 10 minutes.

100 grams of cyclohexanone oxime blocked toluene diisocyanate (TDI) terminated ARCO R45M polybutadiene polyol
6.1 grams of methylene dianiline (MDA) in 6.1 grams of THF
300 grams of toluene The ARCO prepolymer can be made by the following procedure: To a 28 oz. pop bottle is added 247 grams of ARCO R45M polybutadiene polyol and 34.8 grams of toluene diisocyanate. The contents are heated at 70° C. for four hours with stirring. After completion, 300 ml of THF is added and the contents are dissolved. Then add 22.6 grams of cyclohexanone oxime and reflux overnight. Removal of the THF yields the cyclohexanone oxime blocked TDI terminated ARCO polybutadiene polyol.

EXAMPLE 4

Colored Coatings That Are Used in Table 2

The following coatings which are illustrated in Table 2 below are mixed, screened and either sprayed, brushed or rolled onto polyurethane rubber for testing. The coatings are cured at 120°-140° C. for 5 to 60 minutes depending upon which prepolymer is used. As illustrated in Table 2, these prepolymers are preferably polyureaurethanes.

Colored coating No. 14 in Table 2 is applied as a paste rather than as a paint. This material is mixed under vacuum to remove air and poured into a groove on a tire sidewall and cured with heat.

TABLE I

PREPARATION OF COLORED COATINGS

| Number[1] | Prepolymer Used[2] | Grams Prepolymer | Grams HMDA[3] | Grams $T_iO_2$ | Grams Toluene | Cure Time, Min. | Cure Temperature °C. |
|---|---|---|---|---|---|---|---|
| 1 | Adiprene LW 520 - 1700 | 100 | 19.6 | 40 | 300 | 20-10 | 120-140 |
| 2 | $H_{12}MDI^5$ - polymeg 1000 | 100 | 18 | 40 | 200 | 20-10 | 120-140 |
| 3 | $H_{12}MDI$ - Niax D737 | 100 | 11.2 | 40 | 200 | 20-10 | 120-140 |
| 4 | $H_{12}MDI$ - Niax D737 | 100 | 9 | 42.8[4] | 300 | 20-10 | 120-140 |
| 5 | $H_{12}MDI$ - Niax 1025 | 100 | 9 | 42.8[4] | 300 | 30-20 | 120-140 |
| 6 | $H_{12}MDI$ - Niax 2025 | 100 | 12 | 42.8[4] | 300 | 30-20 | 120-140 |
| 7 | $H_{12}MDI$ - Niax 3025 | 100 | 11 | 40 | 200 | 60 | 120 |
| 8 | $H_{12}MDI$ - Niax 3025 | 100 | 8.6 | 42.8[4] | 300 | 60 | 120 |
| 9 | $H_{12}MDI$ - ARCO R45M | 100 | 13 | 40 | 300 | 25-10 | 120-140 |
| 10 | $H_{12}MDI$ - ARCO R45M | 100 | 11 | 42.8[4] | 300 | 25-10 | 120-140 |
| 11 | $H_{12}MDI$ - 75% hydrogenated ARCO R45M | 100 | 12 | 40 | 400 | 20-10 | 120-140 |
| 12 | $H_{12}MDI$ -100% hydrogenated ARCO R45M | 100 | 12 | 42.8[4] | 500 | 20-10 | 120-140 |
| 13 | $H_{12}MDI$ - 100% hydrogenated ARCO R45M | 100 | 11 | 42.8[4] | 500 | 20-5 | 120-140 |
| 14 | Adiprene LW 520 - 1700 | 100 | 3.1[6] | 2[4] | — | 5-60 | 120 |

[1] Numbers in Tables 1, 2 and 3 all refer to the same compositions.
[2] See Table 1 for explanation of terms.
[3] HMDA -hydrogenated methylene dianilines blocked with isobutyraldehyde or methyl isobutyl ketone.
[4] Harwick 10PC03 70% titanium dioxide in DOP and Paraplex G50.
[5] $H_{12}MDI$ - hydrogenated methylene diphenyl isocyanate.

EXAMPLE 5

Painting Urethane Tires

A tire was buffed in the area to be painted. The buffed area was washed with toluene. The colored coating was applied by either spraying, brushing or rolling onto the tire and curing as directed in Example 4. Each of the colored coatings in Table 2 could be used to paint the tire but some are better than others. The tire could also be painted over a primer. The primer is applied to the buffed area by spraying, brushing or rolling.

EXAMPLE 6

The results of testing the coating in Table 2 on polyurethane rubber are summarized below.

TexUS Flex Test — None of the paints tested decrease the TexUS flex life of the urethane rubber. In fact, they may increase the flex life slightly, e.g. 839,000 for the polyurethane versus 1,147,000 for the paint number 13 in Table 2.

Weather Test ASTM D750-68 — All of the paints tested in Table 2 performed satisfactorily in the weather test, but paints made from the polyester (Niax D737) and the hydrogenated Arco performed a little better. No change in adhesion, color or gloss was observed with those coatings.

Tire Testing — The colored coatings were fully tested on both indoor and outdoor tests. In no case when the test was run as described in this application was any discoloration or loss of adhesion observed. A slight loss of gloss was observed after outdoor testing. The colored coatings had the advantage of easy cleaning compared to conventional white-wall tires mounted on a car. Formulation 13 of Table 2 gave a coating without a primer, which coating went 39,000 miles without any loss of adhesion or cracking when mounted on a test car. A white sidewall must adhere to a tire body without cracking when driven at least 15,000 miles, and preferably more.

I claim:

1. A pneumatic tire with polyurethane in the surface exposed at the sidewall, with a cured, colored polyurethane coating over said surface which coating is adhered to said surface by a reaction product of (1) free —NCO from a prepolymer from which the coating is derived, wherein said prepolymer is formed from a substantially saturated hydroxy-terminated diol having a molecular weight of 500 to 10,000 or higher and a substantially saturated aliphatic diisocyanate; with (2) free —OH and —NH in said surface, so that the coating adheres so firmly to the surface that when the tire mounted on a rim and inflated to 24 psi, is tested against a flat large wheel surface at 50 mph., and the pressure of the tire against the wheel is increased to 200 percent of the rated load, as the test is run until the tire fails the coating remains in place and does not crack.

2. A tire of claim 1 in which the coating is adhered directly to the sidewall.

3. A tire of claim 1 in which the coating is adhered to a primer on the sidewall, wherein said primer comprises a polyurethane prepolymer and a curing agent therefore.

4. The method of coating a pneumatic tire having polyurethane in the surface exposed at a sidewall which method comprises (1) applying to said surface a colored coating composition comprising an elastomeric NCO-terminated polyurethane prepolymer and a curing agent therefor wherein said NCO-terminated polyurethane prepolymer reacts with free —OH and —NH in the surface of said tire, and (2) heating to effect said reaction.

5. The method of claim 4 in which the coating is applied directly to the polyurethane sidewall.

6. The method of claim 4 in which a primer of a polyurethane prepolymer and a curing agent is applied to the polyurethane sidewall before applying the coating.

7. The method of claim 4 in which the coating composition includes an aliphatic diamine which is blocked with a ketone or aldehyde and aliphatic diisocyanate-polyurethane prepolymer.

* * * * *

UNITED STATES PATENT OFFICE
CERTIFICATE OF CORRECTION

Patent No. 4,131,149    Dated December 26, 1978

Inventor(s) Durward T. Roberts, Jr.

It is certified that error appears in the above-identified patent and that said Letters Patent are hereby corrected as shown below:

Column 7, line 37
  under the wording "Product from Equation No. 7" and just before "$H_2N$" should be inserted a plus (+) sign.

Column 12, line 50
  Footnote 6 has been omitted from the patent.

Signed and Sealed this

Ninth Day of October 1979

[SEAL]

Attest:

RUTH C. MASON
Attesting Officer

LUTRELLE F. PARKER
Acting Commissioner of Patents and Trademarks